Oct. 31, 1961     F. A. KROHM     3,006,014
WINDSHIELD WIPER UNIT AND WIPER BLADE UNIT ASSEMBLY
Filed March 25, 1957
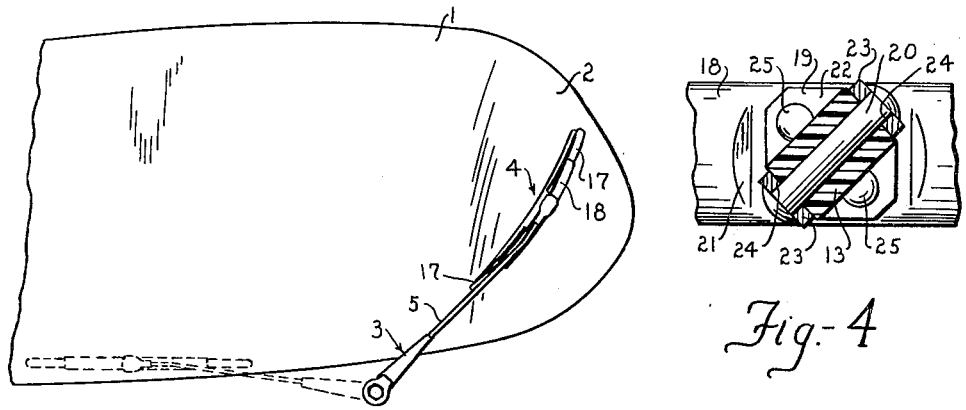
Fig.-1     Fig.-4
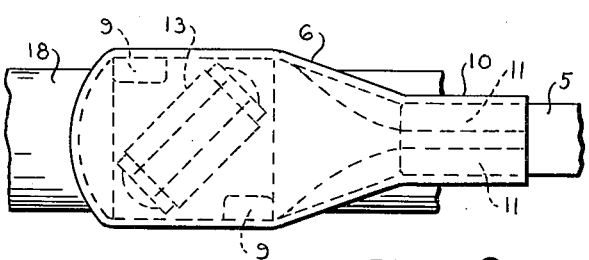
Fig.-2
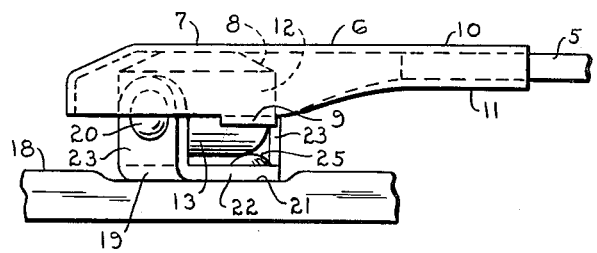 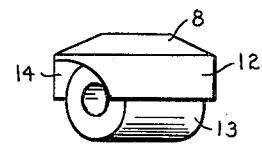
Fig.-3     Fig.-5
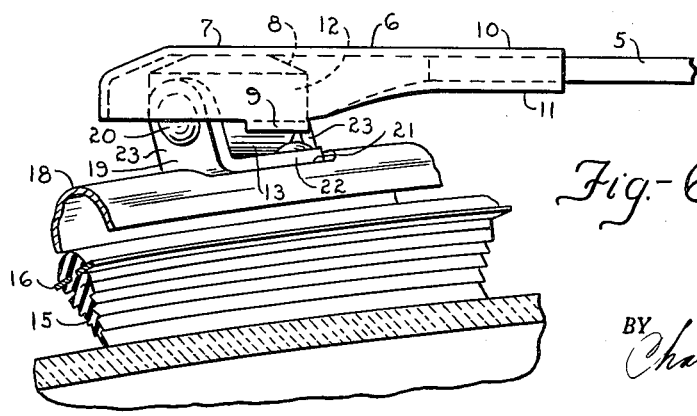
Fig.-6
INVENTOR.
FRED A. KROHM
BY Charles S. Penfold
ATTORNEY

United States Patent Office 3,006,014
Patented Oct. 31, 1961

3,006,014
WINDSHIELD WIPER UNIT AND WIPER
BLADE UNIT ASSEMBLY
Fred A. Krohm, Hobart, Ind., assignor to The Anderson
Company, a corporation of Indiana
Filed Mar. 25, 1957, Ser. No. 648,208
11 Claims. (Cl. 15—250.33)

The present invention relates generally to a windshield wiper arm and a blade assembly and more particularly is directed to a connection therebetween whereby the blade assembly will readily conform to a curved or flat surface. The invention is primarily adapted for use in wiping a windshield generally referred to as the "wrap-around" type.

The connection above referred to may be designed and constructed in various ways, but as disclosed herein preferably includes a member or fitting carried by the blade assembly or unit, a support or member mounted on the arm unit, a bearing carried by the support, and angularly disposed pivot means operatively connecting the fitting and bearing in a manner whereby the blade unit may tilt with respect to the arm unit. More specifically in this regard, the axis of the pivot means is disposed at an oblique angle with reference to the longitudinal axes of the wiper arm and blade units so that all relative movement therebetween is about the axis of the pivot means in order that the blade will be caused to tilt with respect to the arm when the blade is directed back and forth across the windshield by the arm.

The degree of tilt required is that which is necessary to maintain the blade in substantially erect position with respect to the windshield glass, and this degree of tilt depends, first, upon the amount of conforming movement necessary to maintain the longitudinal wiping edge of the blade in contact with the glass, and secondly, upon the angularity of the pivot axis with respect to longitudinal axes of the arm and blade units.

In view of the foregoing, an important object of the invention is to provide an improved simplified connection between an arm unit and a blade unit which can be economically manufactured and assembled.

Another object of the invention is to provide a connection whereby the blade and arm units are relatively movable about a single axis which is disposed at an acute angle to the longitudinal axes of the units.

It is a further object to provide a unique connection wherein the conforming movement of the blade to a variantly curved windshield necessarily affects tilting movement of the blade relative to the arm, the blade and arm being interconnected for movement about a single axis disposed in a plane normal to the direction of force exerted by the arm.

A particular object of the invention is to construct the support on the arm in the form of a housing within which the bearing is received.

A specific object of the invention is to construct the bearing of a non-metallic material, such as a nylon plastic, in order to produce a quiet and smooth pivotal action between the bearing and fitting.

A further object of the invention is to provide a connection in which the bearing is preferably constructed in one piece and includes a tubular cylindrical portion which receives the pivot means and lateral portions which are engaged by portions of the housing support on the arm to hold the bearing in the support.

Other attributes of the invention reside in its simplicity of design and construction, durability and efficiency in use.

Referring to the drawings wherein a preferred construction of the invention is exemplified:

FIGURE 1 is an elevational view depicting the invention embodied in a wiper arm and blade assembly as applied to a curved windshield;

FIGURE 2 is a partial top view of the assembly;

FIGURE 3 is a partial elevational view of the assembly;

FIGURE 4 is a horizontal section taken through the connection between the blade and arm;

FIGURE 5 is a perspective view of the bearing constituting a component of the connection; and FIGURE 6 is a partial perspective view showing the manner in which the blade tilts when travelling over a curved surface.

Referring first to FIGURE 1 of the drawing, there is shown a curved windshield of the wrap-around type having a frontal portion 1 and a rearwardly-extending wing portion 2.

A wiper arm unit generally designated 3 is mounted on a drive shaft preferably adjacent the bottom of the windshield and a wiper blade unit 4 is operatively connected to the arm.

The arm may be designed and constructed in various ways, but as herein disclosed preferably includes an inner section for connection with the shaft and an outer bar section 5 provided with a support 6 which is secured to the free end of the bar. The support is preferably made in the form of a housing comprising an inverted cup 7 within which a bearing 8 is secured by clamping fingers 9 on the cup and a channel 10 having side flanges 11 for clamping the bar section 5 in the channel.

The bearing 8, as mentioned above, is preferably constructed of some desirable non-metallic material, such as nylon plastic, and includes a generally square or rectangular body portion 12 and a connector or tubular cylindrical portion 13 having a longitudinal axis disposed diagonally or in alignment with a pair of the opposed corners of the square body portion, as clearly exemplified in FIGURE 2 of the drawing. The square portion is preferably undercut to provide a pair of recesses 14 adjacent the ends of the tubular portion 13 (only one is shown). It will be noted that the cup includes parallel side walls and adjacent walls which provide a generally square formation conforming to the configuration of the square body portion of the bearing so the latter can be held in a firm nesting position in the cup by the inturned fingers 9 on the cup which engage the lateral under surfaces of the square body portion. The shape of the cup of the support and the bearing are such that the bearing can be mounted in the cup in either of two different positions and still maintain the same angular relationship between the longitudinal axes of the arm and the tubular portion 13 of the bearing. The setup facilitates assembly of the components.

The wiper blade unit 4 may be designed and constructed in various ways, but as herein disclosed preferably includes a resiliently flexible wiper blade comprising a resilient wiping element 15 and a flexible support 16 therefor as illustrated in FIGURE 6 of the drawing and a pressure device preferably comprising a plurality of relatively movable parts such as a pair of secondary yokes 17 having their ends operatively connected to the blade and a bridge 18 having ends connected to the yokes as illustrated in FIGURE 1.

As best illustrated in FIGURES 3, 4 and 6 the connection embodying the subject invention includes the bearing 8 above referred to, a fitting or support member 19 carried by the bridge 18 of the pressure device and pivot means 20. More particularly in this regard, the bridge is provided with a flattened central portion 21 and the fitting with a base portion 22 and upturned portions 23 provided with apertures 24 through which the pivot means extends. The base portion 22 may be secured to the bridge in any suitable manner, but as shown herein is connected thereto by means of a pair of rivets 25 which extend through the base portion of the fitting and through the flat portion 21 of the bridge for permanently securing the fitting in place. Attention is directed to the important fact that the fitting is attached to the bridge so that the upturned portions 23 of the fitting are angularly disposed. In other words, the axes of the apertures 24 in the upturned portions are aligned and disposed at corresponding acute angles with respect to the longitudinal axes of the blade and arm units. It will be noted that the fitting can be attached to the bridge 18 in either of two different positions and still maintain the appropriate angular relationship between the upturned portions of the fitting and the longitudinal axis of the blade unit.

The cylindrical tubular portion 13 of the bearing is interposed between the upturned portions 23 of the fitting with the ends of the upturned portions disposed in the recesses 14. The pivot means 20, which is preferably in the form of an elongate cylindrical pin extends through the apertures 24 in the upturned portions and through the tubular portion of the bearing for pivotally connecting the blade and arm units together. The ends of the pin are preferably upset as depicted in FIGURE 4 to permanently secure the blade and arm units together. It is to be understood that the bearing, as well as the pivot means, may be constructed of any material suitable for the purpose, but in practice the use of a nylon bearing has proven desirable from the standpoint of cost, wearing qualities, and the fact that no lubrication is required. It is also to be understood that if found desirable the pivot means may be constructed out of a suitable plastic material, such as nylon, in which event the bearing may be constructed of a similar material or of metal.

The operation of the device of the present invention is quite simple, and relies upon the fact that the pivot means is utilized to afford that movement between the arm and blade which is necessary for the blade wiping edge to longitudinally conform to the windshield. As the arm and blade are oscillated across the surface of the windshield, the relative vertical inclination of the windshield with respect to the arm changes, and the blade necessarily conforms to the windshield surface because of arm pressure so that the longitudinal wiping edge of the blade remains in constant and full length contact with the windshield. Thus, there is a varying angular relationship between the arm and the blade as these elements traverse the frontal and wing portions or areas of the windshield. This angular relationship is obviously greater whenever the blade is directed over the wing portion.

Because of the angularity of the pivot means, this conforming movement occurs about an axis which is angularly disposed with respect to the longitudinal axes of the arm and the blade units, and this angularity of the sole axis of relative arm-to-blade movement causes the blade unit to tilt relative to the arm, as depicted in FIGURES 1 and 6. If the pivot means were parallel to the longitudinal axes of the arm and the blade units, there could be no movement by which the blade unit could, with certainty, conform to the windshield.

Thus, the present invention provides an improved arm and blade assembly or connection wherein the arm and blade units are interconnected for tilting movement about a single axis defined by the pivot means which lies at an acute or oblique angle to the longitudinal axes of the units. This angular relationship of the pivot means causes concurrent and proportional conforming and tilting movement of the blade unit relative to the arm unit. The tilting movement of the blade unit, which occurs as a consequence of blade conforming movement, causes the blade to remain substantially erect or in the proper wiping attitude to the curved glass surface.

It will, of course, be understood that the angularity of this pivot may be varied within the limits of operability as described above and that the construction is easily arranged for right or left-hand wiper arm construction by obvious revision. Various other details of construction may be varied through a wide range without departing from the principles of this invention, and it is, therefore, not the purpose to limit the patent granted herein otherwise than necessitated by the scope of the appended claims.

I claim:

1. In combination: a spring-urged windshield wiper arm unit provided with a support and a wiper blade unit provided with a support, a nonmetallic bearing carried by one support, and pivot means carried by the other support operatively connected to the bearing and having an axis disposed at an oblique angle with respect to the longitudinal axis of the blade unit in a plane normal to the direction of pressure exerted by the arm.

2. In combination: a spring-urged windshield wiper arm unit provided with a support and a wiper blade unit provided with a support, a bearing carried by one support and having a nonmetallic elongate portion provided with an aperture extending axially therethrough, and pivot means carried by the other support extending into the aperture for operatively connecting the units, the axes of said aperture and pivot means being disposed at an oblique angle with reference to the longitudinal axis of the blade unit in a plane normal to the direction of pressure exerted by the arm.

3. In combination: a spring-urged windshield wiper arm unit provided with a housing at its free end, a bearing secured in said housing, a wiper blade unit provided with a support, and means connecting the bearing and support for relative tilting movement and having an axis disposed at an oblique angle with respect to the longitudinal axis of the blade unit in a plane normal to the direction of pressure exerted by the arm.

4. In combination: a spring-urged windshield wiper arm unit having a housing provided with an inverted cup portion, bearing means secured in the cup and provided with a connector portion, a blade unit having a support receiving the connector portion, and means pivotally connecting the connector portion and support having an axis disposed at an oblique angle with reference to the longitudinal axis of the blade unit in a plane normal to the direction of pressure exerted by the arm.

5. The structure defined in claim 4, in which at least one of said means is made of a nonmetallic material.

6. A spring-urged windshield wiper arm unit having a housing provided with an inverted cup having inturned lugs, a one-piece substantially inflexible nonmetallic bearing having a portion confined in the cup by said lugs, and a tubular connector portion extending from the confined portion for pivotal connection with a member on a wiper blade, said connector portion having an axis disposed at an oblique angle with reference to the longitudinal axis of the arm in a plane normal to the direction of pressure adapted to be exerted by the arm.

7. A spring-urged windshield wiper arm unit having a housing provided with an inverted cup, a one-piece bearing having a portion confined in the cup and a tubular portion extending therefrom for pivotal connection with means on a wiper blade, said tubular portion having an axis being disposed at an oblique angle with reference to the longitudinal axis of the arm in a plane normal to the direction of pressure exerted by the arm.

8. A windshield wiper blade unit, a fitting, means for securing the fitting in either of two positions on the blade unit, said fitting including a pair of upturned portions provided with aligned apertures, and elongate pivot means extending through the apertures for supporting a bearing carried by a spring-urged wiper arm unit, said pivot means having an axis disposed at an oblique angle with respect to the longitudinal axis of the blade unit in a plane normal to the direction of pressure adapted to be exerted by the arm.

9. In combination: a spring-urged wiper arm provided with an inverted cup, a one-piece member having an upper attaching portion secured in the cup and a lower tubular portion, an elongate wiper blade provided with a fitting having opposed spaced portions, and pivot means extending through the tubular portion and the opposed portions of the fitting with its axis disposed at an oblique angle to the longitudinal axis of the blade in a plane normal to the direction of pressure exerted by the arm to enable the blade to pivot and tilt relative to the arm when the blade is directed back and forth on a windshield by the arm.

10. In combination: a spring-urged wiper arm unit provided with a support at its free end, a bearing, means on the support for fastening the bearing to the support, a wiper blade unit provided with a fitting, and means connecting the bearing and fitting for relative tilting movement about an axis disposed at an oblique angle with respect to the longitudinal axis of the blade unit and in a plane normal to the direction of pressure exerted by the arm.

11. An assembly for use in connecting a spring-urged wiper arm unit and a wiper blade unit, said assembly comprising a moulded nonmetallic bearing and a fitting, said bearing comprising a body portion adapted for attachment with one of said units and a portion extending from said body portion and having ends, said body portion being provided with a recess adjacent each of said ends, said fitting comprising a base for attachment with the other of said units and a pair of spaced portions extending from said base, and means carried by said spaced portions connected to said ends for locating the spaced portions in said recesses and affording relative movement between the bearing and fitting about an axis disposed at an oblique angle with reference to the longitudinal axis of said blade unit and in a plane normal to the direction of pressure exerted by the arm unit when said bearing and fitting are respectively attached to said units.

References Cited in the file of this patent

UNITED STATES PATENTS

| | | |
|---|---|---|
| 108,300 | Sessions | Oct. 11, 1870 |
| 1,703,181 | Tarver | Feb. 26, 1929 |
| 2,293,820 | Hansen | Aug. 25, 1942 |
| 2,407,421 | Herold | Sept. 10, 1946 |
| 2,618,805 | Rappl et al. | Nov. 25, 1952 |

FOREIGN PATENTS

| | | |
|---|---|---|
| 615,364 | Great Britain | Jan. 5, 1948 |
| 1,117,795 | France | Mar. 5, 1956 |

UNITED STATES PATENT OFFICE
CERTIFICATE OF CORRECTION

Patent No. 3,006,014                              October 31, 1961

Fred A. Krohm

It is hereby certified that error appears in the above numbered patent requiring correction and that the said Letters Patent should read as corrected below.

Column 4, line 64, for "axis being disposed" read -- axis disposed --.

Signed and sealed this 24th day of July 1962.

(SEAL)
Attest:

ERNEST W. SWIDER
Attesting Officer

DAVID L. LADD
Commissioner of Patents